(12) United States Patent
Patil et al.

(10) Patent No.: US 10,539,067 B2
(45) Date of Patent: Jan. 21, 2020

(54) WASTE GATE ASSEMBLY

(71) Applicant: CUMMINS INC., Columbus, IN (US)

(72) Inventors: Nikhil B. Patil, Pune (IN); Ligong Yang, Columbus, IN (US)

(73) Assignee: Cummins Inc., Columbus, IN (US)

( * ) Notice: Subject to any disclaimer, the term of this patent is extended or adjusted under 35 U.S.C. 154(b) by 187 days.

(21) Appl. No.: 15/355,605

(22) Filed: Nov. 18, 2016

(65) Prior Publication Data

US 2017/0152794 A1    Jun. 1, 2017

Related U.S. Application Data

(60) Provisional application No. 62/260,686, filed on Nov. 30, 2015.

(51) Int. Cl.
| | | |
|---|---|---|
| *F02B 37/18* | (2006.01) | |
| *F16K 1/22* | (2006.01) | |
| *F16K 27/02* | (2006.01) | |

(52) U.S. Cl.
CPC .............. *F02B 37/183* (2013.01); *F16K 1/22* (2013.01); *F16K 27/0218* (2013.01)

(58) Field of Classification Search
CPC ....... F02B 37/183; F16K 27/0218; F16K 1/22
USPC .......................................................... 60/602
See application file for complete search history.

(56) References Cited

U.S. PATENT DOCUMENTS

| | | | | |
|---|---|---|---|---|
| 3,334,858 A | * | 8/1967 | Hay ...................... | F16K 1/2028 |
| | | | | 251/158 |
| 3,591,959 A | * | 7/1971 | Kubis ................... | F02B 37/025 |
| | | | | 123/323 |
| 3,666,235 A | * | 5/1972 | Scott ......................... | F16K 1/22 |
| | | | | 251/118 |
| 3,730,156 A | * | 5/1973 | Sarto ...................... | F02M 26/55 |
| | | | | 123/568.12 |
| 3,941,035 A | * | 3/1976 | Mueller ................ | F02B 37/186 |
| | | | | 60/602 |
| 4,005,578 A | * | 2/1977 | McInerney ........... | F02B 37/186 |
| | | | | 123/564 |
| 4,005,579 A | * | 2/1977 | Lloyd ................... | F02B 37/186 |
| | | | | 123/564 |

(Continued)

FOREIGN PATENT DOCUMENTS

| | | |
|---|---|---|
| DE | 10 2013 021 402 | 7/2014 |
| EP | 2 199 564 | 6/2010 |

(Continued)

OTHER PUBLICATIONS

Search Report dated Apr. 26, 2017 in corresponding United Kingdom application No. GB 1619515.8.

*Primary Examiner* — J. Todd Newton
(74) *Attorney, Agent, or Firm* — Faegre Baker Daniels LLP

(57) ABSTRACT

A waste gate assembly includes a waste gate conduit configured to receive exhaust gas. The waste gate conduit includes a first portion having a first inner diameter and a second portion having a second inner diameter and fluidly coupled to the upstream portion. The first inner diameter is less than the second inner diameter. Additionally, the waste gate assembly includes a waste gate valve operably coupled to the waste gate conduit and configured to move between an open position to permit a flow of the exhaust gas and a closed position to inhibit the flow of the exhaust gas.

21 Claims, 4 Drawing Sheets

(56) References Cited

U.S. PATENT DOCUMENTS

| | | | | |
|---|---|---|---|---|
| 4,111,395 A * | 9/1978 | Sheppard | ............... | F16K 1/22 |
| | | | | 251/208 |
| 4,174,091 A * | 11/1979 | Donahue, Jr. | ......... | F16K 1/2035 |
| | | | | 251/129.2 |
| 5,375,622 A * | 12/1994 | Houston | ............... | F16K 11/076 |
| | | | | 137/240 |
| 5,501,427 A * | 3/1996 | Ando | ............... | F16K 1/2007 |
| | | | | 251/228 |
| 5,904,292 A * | 5/1999 | McIntosh | ........... | G05D 23/1393 |
| | | | | 165/295 |
| 6,041,593 A | 3/2000 | Karlsson et al. | | |
| 6,568,359 B2 * | 5/2003 | Pischinger | ............... | F01L 1/26 |
| | | | | 123/90.11 |
| 6,648,018 B2 * | 11/2003 | Gagnon | ............... | F16K 11/052 |
| | | | | 137/875 |
| 6,850,833 B1 | 2/2005 | Wang et al. | | |
| 6,883,317 B2 | 4/2005 | Heath | | |
| 6,945,048 B2 * | 9/2005 | Whiting | ............... | F02B 29/0406 |
| | | | | 123/559.1 |
| 6,976,359 B2 * | 12/2005 | Hastings | ............... | F02B 37/183 |
| | | | | 251/298 |
| 7,198,252 B2 * | 4/2007 | Anschicks | ............ | F02D 9/1035 |
| | | | | 251/214 |
| 7,264,224 B1 * | 9/2007 | Weston | ............... | F16K 1/18 |
| | | | | 251/298 |
| 8,397,499 B2 | 3/2013 | Doering et al. | | |
| 8,499,557 B2 | 8/2013 | Grabowska | | |
| 8,572,961 B2 | 11/2013 | Karnik et al. | | |
| 9,611,947 B2 * | 4/2017 | Hallisey | ............... | F16K 11/044 |
| 10,221,814 B2 * | 3/2019 | Montigny | ............... | F16K 47/08 |
| 2005/0091976 A1 * | 5/2005 | Whiting | ............... | F02B 29/0406 |
| | | | | 60/602 |
| 2011/0225968 A1 | 9/2011 | Eiraku | | |
| 2013/0247561 A1 | 9/2013 | Russ | | |
| 2014/0366530 A1 | 12/2014 | Murayama et al. | | |
| 2015/0027115 A1 | 1/2015 | Watanabe | | |
| 2015/0047342 A1 | 2/2015 | McConville et al. | | |
| 2015/0075162 A1 * | 3/2015 | Yoshioka | ............... | F02M 26/06 |
| | | | | 60/605.2 |
| 2015/0082790 A1 * | 3/2015 | Yoshioka | ............... | F02B 37/16 |
| | | | | 60/605.2 |
| 2015/0121862 A1 * | 5/2015 | Wade | ............... | F02B 37/22 |
| | | | | 60/602 |
| 2016/0123222 A1 * | 5/2016 | Matthews | ............ | F02B 37/183 |
| | | | | 415/145 |
| 2016/0146097 A1 * | 5/2016 | Ge | ............... | F02B 37/025 |
| | | | | 60/600 |
| 2018/0023464 A1 * | 1/2018 | An | ............... | F02D 9/1015 |
| | | | | 60/612 |
| 2018/0128161 A1 * | 5/2018 | Alvarez | ............... | F01N 3/2006 |
| 2018/0128162 A1 * | 5/2018 | Miazgowicz | ......... | F02B 37/025 |

FOREIGN PATENT DOCUMENTS

| | | |
|---|---|---|
| GB | 2519136 | 5/2015 |
| JP | 2013-068201 | 4/2013 |
| JP | 2013068201 A * | 4/2013 |

\* cited by examiner

WASTE GATE ASSEMBLY

CROSS-REFERENCE TO RELATED APPLICATIONS

The present application claims priority to U.S. Provisional Patent Application Ser. No. 62/260,686, filed Nov. 30, 2015, and entitled "WASTE GATE ASSEMBLY," the complete disclosure of which is expressly incorporated by reference herein.

TECHNICAL FIELD OF THE DISCLOSURE

The present disclosure relates to a waste gate assembly for an engine, and more particularly, to an external waste gate assembly configured to distribute a pressure drop across an upstream or downstream portion of the waste gate assembly.

BACKGROUND OF THE DISCLOSURE

An engine system, especially for a high horsepower engine, may include a turbocharger which includes a turbine and a compressor. Additionally, the engine system may include a waste gate assembly which diverts exhaust gases from the engine away from the turbocharger. Diverting exhaust gases away from the turbocharger may regulate the turbine speed and, therefore, regulate the speed of the compressor. In some engine systems, an internal waste gate assembly may be provided, however, alternative embodiments of engine systems include external waste gate assemblies.

The exhaust gases entering the waste gate assembly of an engine system are under high pressure. When the highly pressurized exhaust gases flow into the waste gate assembly, the gases come into contact with portions of a waste gate valve of the waste gate assembly. The high pressure differential across the waste gate valve may cause flow to accelerate beyond sonic levels which can result in the formation of a shock wave(s) within the waste gate assembly. Shock waves cause large pressure fluctuations which can lead to structural failures of portions of the waste gate assembly. Therefore, there is a need for a waste gate assembly which minimizes the likelihood of shock wave formation therein.

SUMMARY OF THE DISCLOSURE

In one embodiment of the present disclosure, a waste gate assembly comprises a waste gate conduit configured to receive exhaust gas. The waste gate conduit includes a first portion having a first inner diameter and a second portion having a second inner diameter and fluidly coupled to the upstream portion. The first inner diameter is less than the second inner diameter. Additionally, the waste gate assembly comprises a waste gate valve operably coupled to the waste gate conduit and configured to move between an open position to permit a flow of the exhaust gas and a closed position to inhibit the flow of the exhaust gas.

In one aspect of the waste gate assembly, the first diameter is 40-75% of the second diameter.

In another aspect of the waste gate assembly, the first diameter is 20-35 mm and the second diameter is 40-50 mm.

In another aspect of the waste gate assembly, the waste gate valve is positioned in the second portion of the waste gate conduit.

In another aspect of the waste gate assembly, a diameter of the waste gate valve is greater than the first diameter.

In a further aspect of the waste gate assembly, the diameter of the waste gate valve is 40-50 mm and the first diameter is 20-35 mm.

In another aspect of the waste gate assembly, a pressure drop of the exhaust gas is constant across the second portion.

In another embodiment of the present disclosure, an engine assembly comprises an engine, an exhaust manifold fluidly coupled to the engine, and a waste gate assembly fluidly coupled to the exhaust manifold and configured to receive at least a portion of exhaust gas from the exhaust manifold. The waste gate assembly includes a waste gate valve, a first portion of the waste gate valve, and a second portion of the waste gate valve. The first portion has a smaller diameter than that of the second portion.

In one aspect of the engine assembly, the diameter of the first portion is 40-75% of a diameter of the second portion.

In another aspect of the engine assembly, the diameter of the first portion is 20-35 mm and the diameter of the second portion is 40-50 mm.

In one aspect of the engine assembly, the engine assembly further comprises an exhaust collector, and the first portion is fluidly coupled to the exhaust manifold and the second portion is fluidly coupled to the exhaust collector.

In a further aspect of the engine assembly, the engine assembly further comprises a turbocharger fluidly coupled to the exhaust manifold and the exhaust collector, and the turbocharger is outside of the waste gate assembly.

In another aspect, the engine assembly further comprises an after-treatment assembly fluidly coupled to the exhaust collector.

In another aspect of the engine assembly, the waste gate assembly includes a valve actuator operably coupled to the waste gate valve, and the valve actuator is configured to move the waste gate valve between an open position permitting a flow of exhaust gas through the second portion and a closed position inhibiting the flow of exhaust gas through the second portion.

In a further embodiment of the present disclosure, a method comprises operating an engine, directing exhaust gas from the engine to a waste gate assembly, routing the exhaust gas through a first conduit of the waste gate assembly, opening a waste gate valve downstream of the first conduit, and directing the exhaust gas through a second conduit of the waste gate assembly having a larger diameter than a diameter of the first conduit in response to opening the waste gate valve.

In one aspect, the method further comprises distributing a pressure in the second conduit homogenously across a length and the diameter of the second conduit.

In another aspect, the method further comprises directing the exhaust gas from the second conduit to an exhaust collector.

In a further aspect, the method further comprises directing the exhaust gas from the exhaust collector to an after-treatment assembly.

In another aspect, the method further comprises directing at least a portion of the exhaust gas from the engine to a turbocharger.

In a further aspect, the method further comprises decreasing a pressure of the exhaust gas in response to directing the exhaust gas through the second conduit.

Advantages and features of the embodiments of this disclosure will become more apparent from the following detailed description of exemplary embodiments when viewed in conjunction with the accompanying drawings.

DETAILED DESCRIPTION OF THE DRAWINGS

Figure 1:
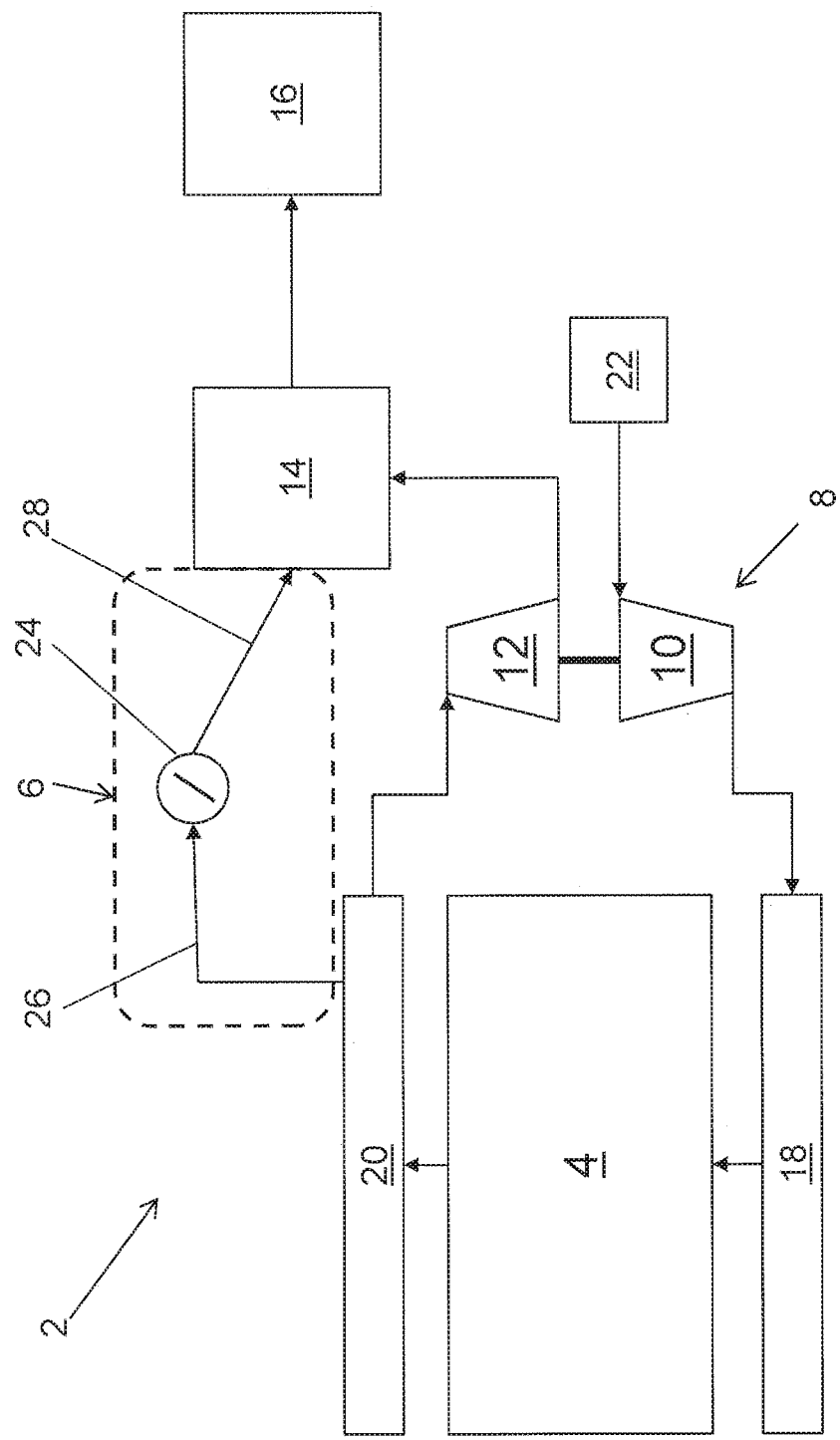
FIG. 1 is a schematic view of an engine assembly including an engine, an exhaust collector, and a waste gate assembly of the present disclosure.
Figure 2:
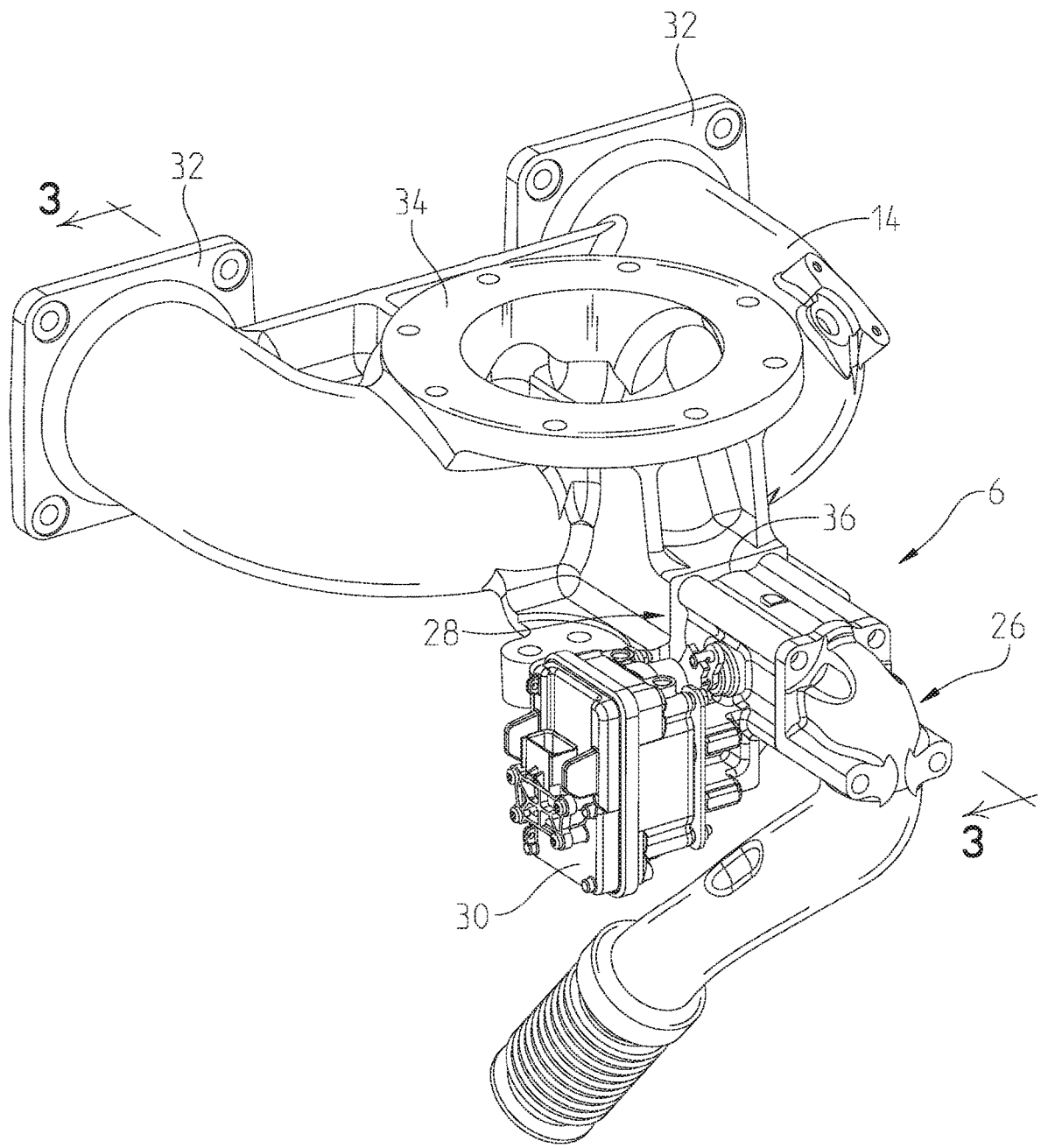
FIG. 2 is a perspective view of the exhaust collector and the waste gate assembly of FIG. 1.

Referring to FIGS. 1 and 2, an engine assembly 2 includes an internal combustion engine 4, a waste gate assembly 6, a turbocharger 8 having a compressor 10 and a turbine 12, an exhaust collector 14, an after-treatment assembly 16, and an air filter 22. Engine 4 includes a plurality of cylinders (not shown) fluidly coupled to an intake manifold 18 and an exhaust manifold 20. Exhaust manifold 20 is fluidly coupled to turbine 12 of turbocharger 8 and waste gate assembly 6. Illustratively, waste gate assembly 6 is external of engine 4 and includes a waste gate valve 24, a first or upstream portion or conduit 26 upstream of waste gate valve 24 and fluidly coupled to exhaust manifold 20, a second or downstream portion or conduit 28 downstream of waste gate valve 24 and fluidly coupled to exhaust collector 14, and a waste gate valve actuator 30 (FIG. 2) to control operation of waste gate valve 24.

Additionally, as shown in FIGS. 1 and 2, exhaust collector 14 includes at least three ports for fluidly coupling with turbocharger 8, after-treatment assembly 16, and waste gate assembly 6. More particularly, exhaust collector 14 includes at least a first port 32 for fluidly coupling to turbocharger 8, a second port 34 for fluidly coupling to after-treatment assembly 16, and a third port 36 for fluidly coupling to waste gate assembly 6 (FIG. 2).

As shown in FIG. 1, during operation of engine assembly 2, air from air filter 22 flows to intake manifold 18 through compressor 10 of turbocharger 8. The air within intake manifold 18 flows into the cylinders of engine 4 and mixes with a fuel during a combustion cycle of each cylinder. After combustion occurs in the cylinders, the exhaust gases within the cylinders of engine 4 are directed into exhaust manifold 20. The exhaust gases are then directed to exhaust collector 14 through compressor 12 of turbocharger 8 and/or to waste gate assembly 6, depending on the operating conditions and application of engine assembly 2. For example, the exhaust gases may bypass waste gate assembly 6 and flow into exhaust collector 14 through compressor 12 of turbocharger 8. However, under certain operating conditions, for example when it is necessary to regulate the speed of compressor 10 and turbine 12 of turbocharger 8, at least a portion of the exhaust gases may bypass turbocharger 8 and flow into waste gate assembly 6.

When at waste gate assembly 6, the exhaust gases first flow into first portion 26 of waste gate assembly 6 which is upstream of waste gate valve 24. The exhaust gases then flow through waste gate valve 24 and into second portion 28 of waste gate assembly 6 before being directed to exhaust collector 14. The exhaust gases within exhaust collector 14 are then directed toward after-treatment assembly 16 or, alternatively, a muffler (not shown) of engine assembly 2.

Figure 3:
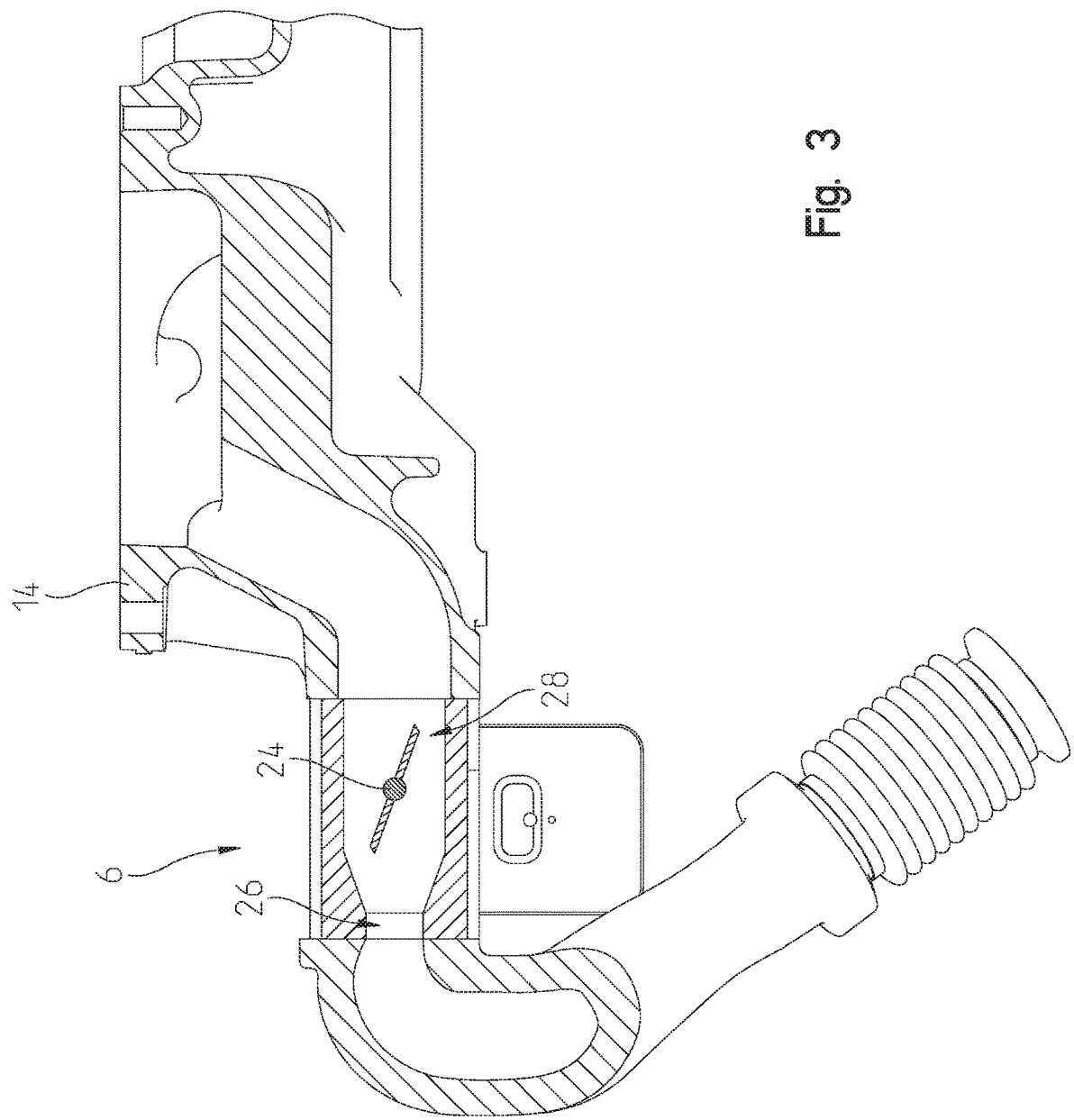
FIG. 3 is a cross-sectional view of the waste gate assembly of FIG. 2, taken along line 3-3 of FIG. 2.
Figure 4:
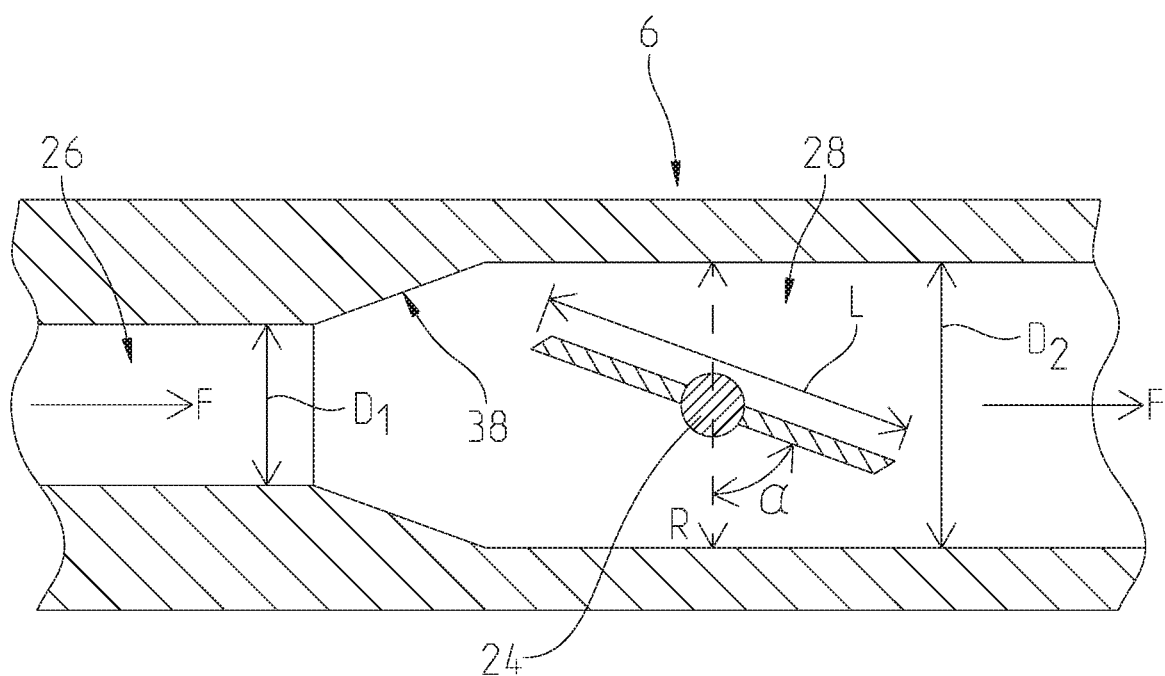
FIG. 4 is a cross-sectional view of a portion of the waste gate assembly of FIG. 3.

Referring to FIGS. 2-4, first portion 26 of waste gate assembly 6 is fluidly coupled to second portion 28 through a tapered portion 38. In one embodiment, first portion 26 is integrally formed with second portion 28 such that first and second portions 26, 28 and tapered portion 38 define a single waste gate conduit which includes waste gate valve 24. Alternatively, first portion 26, second portion 28, and tapered portion 38 each may define a separate component which, when coupled together, form a waste gate conduit.

As shown in FIG. 3, first portion 26 has a first inner diameter $D_1$ and second portion 28 has a second inner diameter $D_2$, which is greater than first inner diameter $D_1$. In one embodiment, first inner diameter $D_1$ is 40-75% of second inner diameter $D_2$. For example, first inner diameter $D_1$ may be 20-35 mm and, more particularly, may be 27-28 mm. Additionally, second inner diameter $D_2$ may be 40-50 mm and, more particularly, may be 44-45 mm. As such, the exhaust gases from exhaust manifold 20 flow through a restricted flow path before reaching waste gate valve 24 in second portion 28. By decreasing first inner diameter $D_1$ upstream of waste gate valve 24, waste gate valve 24 may open more to allow for a predetermined flow rate of the exhaust gases into second portion 28, as disclosed further herein.

As shown in FIG. 3, waste gate valve 24 is positioned within second portion 28. Illustratively, waste gate valve 24 defines a butterfly valve, although waste gate valve 24 may be any type of valve. Waste gate valve 24 is operably coupled to waste gate valve actuator 30 which moves waste gate valve 24 between a closed position, in which waste gate valve 24 contacts the inner surface of second portion 28 to block or inhibit the flow of exhaust gases through second portion 28, and a fully open position, in which waste gate valve 24 extends parallel to a flow path F (FIGS. 4 and 5) of exhaust gas through second portion 28. Waste gate valve 24 may be retained in any positioned between the closed position (e.g., waste gate valve 24 extends perpendicularly to flow path F) and the open position (e.g., waste gate valve 24 extends parallel to flow path F). As shown in FIG. 3, waste gate valve 24 is in a partially open position in which waste gate valve 24 is angled less than 90° relative to flow path F of exhaust gas but also is spaced part from the inner surface of second portion 28 to allow a flow of exhaust gases. Waste gate valve 24 has a diameter or length L which may be the same or greater than second inner diameter $D_2$ such that waste gate valve 24 is configured to contact the inner surface of second portion 28 when in the closed position to inhibit flow path F of exhaust gas through second portion 28. For example, when exhaust gases are directed to turbocharger 8, rather than waste gate assembly 6, waste gate valve 24 may be in the closed position to prevent flow of exhaust gases therethrough. In one embodiment, length L of waste gate valve 24 may be approximately 40-50 mm and, more particularly 45 mm. As such, length L of waste gate valve 24 may be approximately the same as second inner diameter $D_2$ of second portion 28 but is greater than first inner diameter $D_1$ of first portion 26.

When the exhaust gases bypass turbocharger 8, for example, to regulate the speed of compressor 10 and turbine 12, the exhaust gases flow into first portion 26 of waste gate assembly 6 from exhaust manifold 20. The exhaust gases flowing into first portion 26 are highly pressurized such that the pressure of the exhaust gases flowing into first portion 26 may be 3-4 bar. However, flow F of exhaust gases within first portion 26 is restricted due to the decreased first inner diameter $D_1$ of first portion 26. As such, waste gate valve 24 opens more to increase the flow of the exhaust gases into second portion 28 and maintain a predetermined flow rate through waste gate assembly 6 for given parameters and operating conditions of engine assembly 2. For example, as shown in FIG. 4, waste gate valve 24 opens to an angle α, which may be 60-80° relative to a radial line R extending radially within second portion 28. In one embodiment, angle α may be 70° relative to a radial line R.

Figure 5:
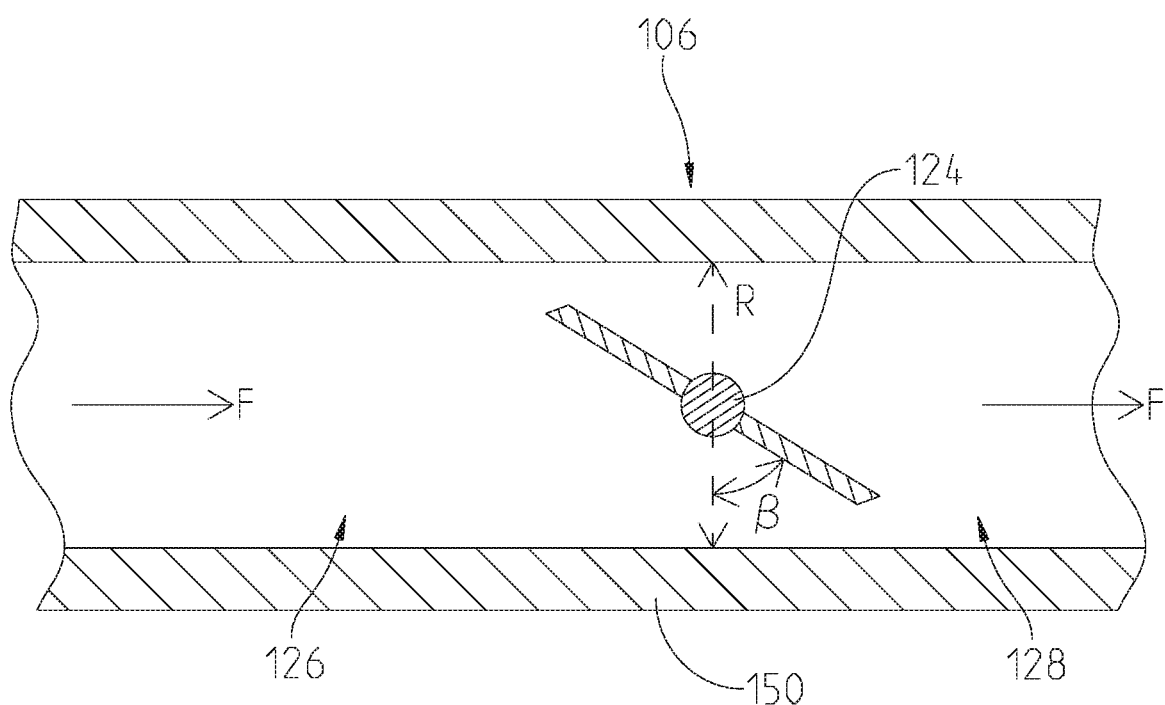
FIG. 5 is a cross-sectional view of a prior art waste gate assembly.

Conversely, as shown in FIG. 5, if a prior art waste gate assembly 106 includes a waste gate conduit 150 with a single diameter extending from an upstream portion 126 to a downstream portion 128, waste gate valve 124 opens less than waste gate valve 24 of FIG. 4. For example, waste gate valve 124 may only open to an angle β, which may be approximately 55-59° relative to radial line R of waste gate conduit 150. As such, waste gate valve 24 of FIG. 4 opens more when first portion 26 has a decreased diameter than waste gate valve 124 of FIG. 5 which has a single diameter conduit 150. Because waste gate valve 24 of FIG. 4 opens more than waste gate valve 124 of FIG. 5, any restriction in flow F of the exhaust gases through waste gate valve 24 decreases relative to waste gate valve 124.

As the exhaust gases flow through waste gate valve 24, the pressure of the exhaust gases decreases to approximately 0.5-1.0 bar in second portion 28. The pressure drop in the exhaust gases is distributed approximately evenly across length L of waste gate valve 24, second inner diameter $D_2$ of second portion 28, and the length of second portion 28 downstream of waste gate valve 24. By evenly or homogenously distributing the pressure drop of the exhaust gases within second portion 28, the risk of shock wave formation due to the supersonic flow of the exhaust gases through waste gate assembly 6 is reduced. As such, the restricted first inner diameter $D_1$ upstream of waste gate valve 24 requires that waste gate valve 24 opens more to an angle α to accommodate the flow rate through waste gate assembly 6. The increased opening of waste gate valve 24 evenly distributes the pressure drop of the exhaust gases across waste gate valve 24 with decreases the risk of shock wave formation within waste gate assembly 6 which may be caused by contact of the supersonic flow of the exhaust gases with waste gate valve 24 and the inner surface of second portion 28.

In one embodiment, the decreased risk of shock wave formation is evidenced by a decreased Mach Number, temperature, and turbulent kinetic energy of the exhaust gases in second portion 28 of waste gate assembly 6. For example, the Mach Number of the exhaust gases within second portion 28 of FIG. 4 may be less than 1.12, for example 0.0-1.0, whereas the Mach Number of the exhaust gases within downstream portion 128 of FIG. 5 may be greater than 2.50, thereby indicating that there is a decreased likelihood of shock wave formation with the configuration of waste gate assembly 6 of FIG. 4 compared to the configuration of waste gate assembly 106 of FIG. 5. Additionally, in one embodiment, the static temperature of the exhaust gases within second portion 28 of FIG. 4 may be less than 600 K, for example 350-580 K, whereas the static temperature of the exhaust gases within downstream portion 128 of FIG. 5 may be greater than 840 K, thereby indicating that there is a decreased likelihood of shock wave formation with the configuration of waste gate assembly 6 of FIG. 4 compared to the configuration of waste gate assembly 106 of FIG. 5. Also, in one embodiment, the turbulent kinetic energy of the exhaust gases within second portion 28 of FIG. 4 may be less than 30,000 $m^2/s^2$, for example 0-28,000 $m^2/s^2$, whereas the turbulent kinetic energy of the exhaust gases within downstream portion 128 of FIG. 5 may be greater than 40,000 $m^2/s^2$, thereby indicating that there is a decreased likelihood of shock wave formation with the configuration of waste gate assembly 6 of FIG. 4 compared to the configuration of waste gate assembly 106 of FIG. 5.

While the embodiment of FIGS. 1-4 discloses that first portion 26 has a reduced diameter relative to second portion 28, in an alternative embodiment, second portion 28 may have a reduced diameter relative to first portion 26. As such, flow path F for the exhaust gases may be restricted within second portion 28 rather than first portion 26, however, the restricted flow in second portion 28 would still decrease the likelihood of shock wave formation within waste gate assembly 6.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. A waste gate assembly configured to be fluidly coupled to a turbocharger having a compressor and a turbine, comprising:
   a waste gate conduit configured to receive exhaust gas in response to a speed of at least one of the compressor and turbine of the turbocharger, the waste gate conduit including a first portion having a first inner diameter and a second portion having an inner surface and a second inner diameter defining the inner surface, and the second portion is fluidly coupled to the first portion, and the first inner diameter is different from the second inner diameter and the first inner diameter is 40-75% of the second inner diameter; and
   a waste gate valve operably coupled to the waste gate conduit and configured to move between an open position to permit a flow of the exhaust gas and a closed position to inhibit the flow of the exhaust gas.

2. The waste gate assembly of claim 1, wherein the first diameter is 20-35 mm and the second diameter is 40-50 mm.

3. The waste gate assembly of claim 1, wherein a diameter of the waste gate valve is greater than the first inner diameter.

4. The waste gate assembly of claim 3, wherein the diameter of the waste gate valve is 40-50 mm and the first diameter is 20-35 mm.

5. The waste gate assembly of claim 1, wherein pressure drop of the exhaust gas is constant across the second portion.

6. The waste gate assembly of claim 1, wherein the exhaust gas flows from the first portion to the second portion.

7. The waste gate assembly of claim 1, wherein the first inner diameter axially aligns with the second inner diameter.

8. The waste gate assembly of claim 1, wherein the first inner diameter tapers to the second inner diameter.

9. The waste gate assembly of claim 1, wherein the waste gate valve has a length at least equal to the second inner diameter.

10. An assembly for use with an engine comprising:
   an exhaust manifold fluidly coupled to the engine; and
   a waste gate assembly fluidly coupled to the exhaust manifold and to a turbocharger having a compressor and a turbine, the waste gate assembly configured to receive at least a portion of exhaust gas from the exhaust manifold in response to a speed of at least one of the compressor and turbine of the turbocharger, the waste gate assembly including a waste gate valve and a waste gate conduit defined by a first conduit portion and a second conduit portion, and the first conduit portion has a diameter that is different from a diameter of the second conduit portion, wherein the diameter of the second conduit portion defines a maximum diameter of the waste gate conduit, and the length of the waste gate valve is at least equal to the diameter of the second portion.

11. The assembly of claim 10, wherein the diameter of the first portion is 20-35 mm and the diameter of the second portion is 40-50 mm.

12. The assembly of claim 10, further comprising an exhaust collector, and the first portion of the waste gate assembly is fluidly coupled to the exhaust manifold and the second portion of the waste gate assembly is fluidly coupled to the exhaust collector.

13. The assembly of claim 12, further comprising
a turbocharger fluidly coupled to the exhaust manifold and the exhaust collector, and the turbocharger is outside of the waste gate assembly.

14. The assembly of claim 12, further comprising an after-treatment assembly fluidly coupled to the exhaust collector.

15. The assembly of claim 10, wherein the waste gate assembly includes a valve actuator configured to move the waste gate valve between an open position permitting a flow of exhaust gas through the second portion and a closed position inhibiting the flow of exhaust gas through the second portion.

16. A method, comprising:
operating an engine;
directing exhaust gas from the engine to a waste gate assembly, the waste gate assembly configured to be fluidly coupled to a turbocharger having a compressor and a turbine;
routing the exhaust gas through a first conduit of the waste gate assembly, the first conduit having a first inner surface;
opening a waste gate valve downstream of the first conduit;
in response to opening the waste gate valve, directing the exhaust gas from the first conduit to a second conduit of the waste gate assembly, the second conduit having a second inner surface defined by a larger diameter than a diameter of the first inner surface of the first conduit;
moving the waste gate valve to a position substantially parallel with the flow of exhaust gas when in a fully open position; and
closing the waste gate assembly when the waste gate valve contacts the second inner surface.

17. The method of claim 16, further comprising distributing a pressure in the second conduit homogenously across a length and the diameter of the second conduit.

18. The method of claim 16, further comprising directing the exhaust gas from the second conduit to an exhaust collector.

19. The method of claim 18, further comprising directing the exhaust gas from the exhaust collector to an aftertreatment assembly.

20. The method of claim 16, further comprising directing at least a portion of the exhaust gas from the engine to a turbocharger.

21. The method of claim 16, further comprising decreasing a pressure of the exhaust gas in response to directing the exhaust gas through the second conduit.

* * * * *